US012762739B1

(12) United States Patent
Rajan et al.

(10) Patent No.: US 12,762,739 B1
(45) Date of Patent: Oct. 13, 2026

(54) CLOUD-ASSISTED CALIBRATION OF EDGE DEVICE MACHINE LEARNING SYSTEM

(71) Applicant: Samsara Inc., San Francisco, CA (US)

(72) Inventors: Narendran Rajan, San Diego, CA (US); Sharan Srinivasan, Newark, CA (US); Jing Wang, Toronto (CA); Yan Wang, Mercer Island, WA (US); William Nathan Hurst, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 494 days.

(21) Appl. No.: 18/055,336

(22) Filed: Nov. 14, 2022

(51) Int. Cl.
*G06T 7/80* (2017.01)
*G06V 20/56* (2022.01)

(52) U.S. Cl.
CPC ................ *G06T 7/80* (2017.01); *G06V 20/56* (2022.01); *G06T 2207/20081* (2013.01)

(58) Field of Classification Search
CPC ............. G06T 7/80; G06T 2207/10016; G06T 1107/30248; G06T 2207/30252; G06T 2207/30268; G06T 2207/20081; G06V 20/56; G06V 20/52; G06V 20/59; G06V 10/82
See application file for complete search history.

(56) References Cited

U.S. PATENT DOCUMENTS 12,072,954 B1 * 8/2024 Li ....................... G06F 18/2148
12,175,750 B1 * 12/2024 Cheruku ................ G06V 20/41
12,300,000 B2 * 5/2025 Fowe ........................ G06T 7/20
2018/0234351 A1 * 8/2018 Amento .................. H04L 12/18
2020/0043197 A1 * 2/2020 Bazin ...................... G06N 20/20
2020/0168014 A1 * 5/2020 Uliyar ..................... G06V 20/46
2021/0377275 A1 12/2021 Grønvik et al.
2021/0407520 A1 12/2021 Neckermann et al.
2021/0409416 A1 12/2021 Reyna Fernandez
2022/0027194 A1 1/2022 Damani et al.
2022/0301192 A1 * 9/2022 Boardman .............. G06T 7/579
2023/0138798 A1 * 5/2023 Kah ..................... G06V 10/774
382/157
2023/0222318 A1 7/2023 Lepikhin et al.
2025/0037311 A1 * 1/2025 Mukherjee ............ B60W 50/14

FOREIGN PATENT DOCUMENTS

CN 113705435 A * 11/2021
CN 117690106 A 3/2024

OTHER PUBLICATIONS

Non-Final Office Action, U.S. Appl. No. 18/055,351, Feb. 11, 2025, 8 pages.

* cited by examiner

*Primary Examiner* — Stephen R Koziol
(74) *Attorney, Agent, or Firm* — Nicholson De Vos Webster & Elliott LLP

(57) ABSTRACT

Methods, systems, and apparatuses include an edge device utilizing a deep learning model. In one embodiment the method comprises receiving streaming data from a dashcam via a bidirectional channel, upon initialization, analyzing the streaming data to run a calibration algorithm to identify settings for a machine learning model for the dashcam, and sending the settings to the dashcam. The method further includes the dashcam, upon receipt of the settings, turning off the streaming data and running a machine learning system on the dashcam, the machine learning system utilizing the settings from the analyzing.

20 Claims, 8 Drawing Sheets

CLOUD-ASSISTED CALIBRATION OF EDGE DEVICE MACHINE LEARNING SYSTEM

TECHNICAL FIELD

One or more embodiments relate to edge devices; and more specifically, to machine learning systems on edge devices.

BACKGROUND ART

The market is exploding with edge devices ranging from dash cameras and home security cameras to robots and other devices. Many of these edge devices are designed to utilize machine learning systems for example to recognize potential dangers. However, these edge devices have limited memory and processing power.

One way of enabling machine learning on such edge devices is to create and train a machine learning system on a server, and then upload the fully trained system to the edge device. The edge device can then use its limited memory and processing power to run the machine learning system.

However, this design has some limitations, especially for edge devices which are not factory installed. For example, after market dashboard cameras are installed by users. Therefore, the precise position of the camera with respect to the vehicle, the road, and the driver is not fixed. Because the machine learning system is pre-trained, the system may not perform well.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

DETAILED DESCRIPTION

The following description describes methods and apparatus for creating a customized edge device system, running an improved machine learning system. The improved machine learning system in one embodiment includes a cloud agent that establishes a bidirectional channel with a plurality of edge devices, and providing a customized machine learning system to the edge device. In non-limiting examples, the edge devices may be dashboard cameras, security cameras, access control systems, drones, mobile devices of all sorts, including smart watches. An edge device may be any computer device capable of running applications, with a limited computing capability. In one embodiment, edge devices are far from the cloud or a big data center. Machine learning at the edge is relevant when sensor data is collected from sources far from the cloud and locally processed by the edge device.

In one embodiment, the customized machine learning system may be customized based on a classification of the edge device and edge device environment. In one embodiment, the customized machine learning system may be customized based on personalization to the individual edge device. In one embodiment, the customization may use a two-layer machine learning model in which a thin customization layer is overlaid on a base machine learning model. In non-limiting examples, the edge devices can be used in fleet management applications, asset tracking applications, industrial applications (manufacturing analytics, process monitoring, condition monitoring), and remote monitoring of environments (such as in factories, warehouses, etc.), etc. In one embodiment, the present system provides a compact customized deep learning model for the edge device.

Edge devices can be configured with machine learning aspects, which utilize the data obtained by the edge device, to make certain determinations. For example, an inward facing dashboard camera (or dashcam) may be used to monitor a driver's mobile phone use, and ensure that they remain focused on driving. Similarly, an inward facing dashcam can be used to monitor for other indications of inattention or exhaustion, or compliance with employer policies. An outward facing dashcam may be also used to track how the driver is driving or whether they are straying outside the lanes or following other cars too closely. Other edge devices may include security cameras, and other devices which include one or more sensors and a processor to implement machine learning system to analyze the sensor data, and optionally provide recommendations or take actions.

Figure 1:
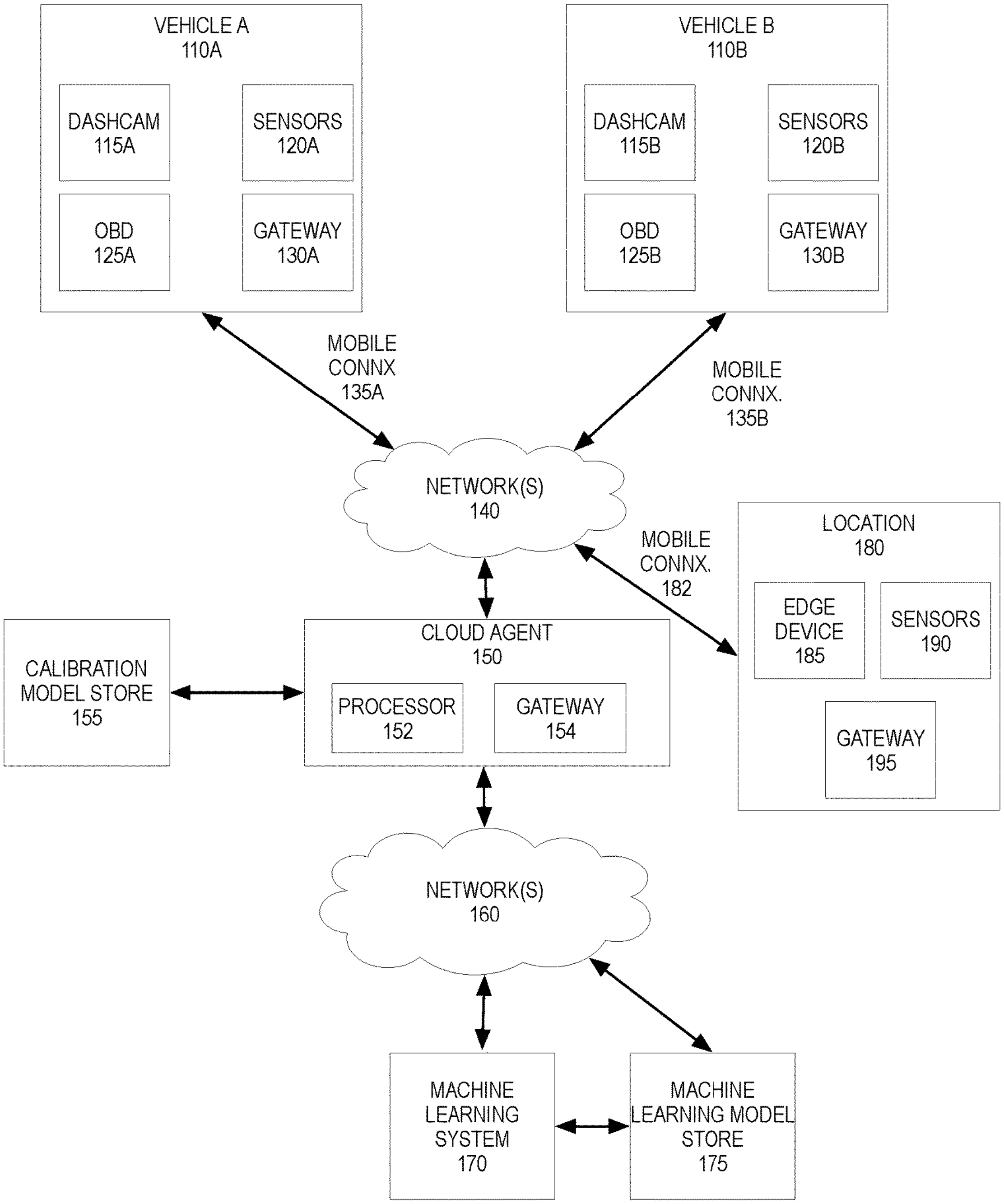
FIG. 1 is a block diagram illustrating customized edge device system, according to some embodiments.

FIG. 1 is a block diagram illustrating customized edge device system, according to some embodiments. The illustrated system includes multiple edge devices 115A, 115B, 185 in multiple locations, 110A, 110B, 180. The edge devices may include dashcams 115A, 115B, and other edge devices 185 in vehicles 110A, 110B, or other locations 180.

The locations of the edge devices 115A, 115B, 185 are in vehicle A 110A, vehicle B 110B, and location 180 respectively. In one embodiment, the location may also include other sensors 120A, 120B, 190. In one embodiment, when the edge device is a dashcam 115A, 115B, the dashcam 115A, 115B interfaces with the on-board diagnostics (OBD) 125A, 125B of the vehicles 110A, 110B. In one embodiment, the edge device 115A, 115B, 185 connects to a network via communications gateway 130A, 130B, 195. The gateway in one embodiment uses mobile connectivity (LTE, 5G, etc.) to establish a data connection with a cloud agent 150 via network 140.

The edge devices 115A, 115B, 185 are coupled to a network 140. In one embodiment, the devices are coupled via a mobile connection 135A, 135B, 182. In another embodiment, another type of network connection may be used. For example, if location 180 is a location where wired network connections are available, the connection 182 may be an Ethernet connection, Wi-Fi connection, or another type of network connection. Network 140 may be the Internet, a cellular network, a local area network, or another type of network. Although network 140 is illustrated as a single network, one of skill in the art would understand that it may include a variety of types of networks.

A cloud agent 150 is coupled to network 140. Cloud agent 150 is a computer system or server system that provides access to computing resources. In one embodiment, cloud agent 150 includes processor 152 and gateway 154 to communicate with the edge devices 115A, 115B, 185. In one embodiment, the cloud agent 150 is a distributed cloud computing element, and thus there isn't a singular processor or gateway but rather cloud agent 150 has access to processing power from one or more devices. In one embodiment, a cloud agent 150 interfaces with a plurality of edge devices. In one embodiment, the cloud agent 150 comprises one or more systems which are in communication which collectively have access to all edge devices.

The cloud agent 150 is configured to analyze the data from the edge devices 115A, 115B, 185 and select the customized machine learning system to the edge devices 115A, 115B, 185, as will be described in more detail below. In one embodiment, the cloud agent 150 utilizes a calibration model store 155. The calibration store model includes in one embodiment calibration algorithms that may be utilized by the cloud agent 150 to find the optimal settings for the edge devices. The cloud agent 150 provides the optimal settings for the machine learning systems in the edge devices.

The cloud agent 150 receives the machine learning algorithms from machine learning system 170. Cloud agent 150 in one embodiment is coupled to machine learning system 170 via a network 160. In some embodiment, the cloud agent 150 may be on the same server system as machine learning system 170. Machine learning system 170 in one embodiment is a computer system implementing a training system for deep learning models. In one embodiment, the machine learning system 170 generates a plurality of deep learning models, based on a category of the device. This is referred to as sharding.

Sharding addresses some issues with conventional machine learning. Data is too sparse to train a separate model per customer. Many customers have little to no data to train on, leading to degeneracy or overfitting of custom machine learning models. However, having a one size fits all model is hard to optimize since organizations have very different setups. For example, for dashcams, customer organizations have different vehicle sizes and types, with different camera mounts. Even if there was sufficient data per customer in place, deploying different models per customer is costly and requires sophisticated infrastructure. Therefore, the present system addresses these issues by splitting the system into a base layer machine learning system, with a thin personalization layer that is customized. The resulting machine learning model is optimized for the user, but does not utilize full personalization since the underlying base layer is common across devices. Note that although the "base layer" is referred to as being a general machine learning system, different types of edge devices typically have different base layers. In some embodiments, the same type of edge devices used in different environments may also have different base layers.

Each of the deep learning models, in one embodiment, is optimized for a certain set of characteristics. The characteristics, for a dashcam, in some embodiments may be based on the vehicle type, such as sedan, SUV, bus, truck, etc. The characteristics for the dashcam may further include dashcam orientation. The characteristics that may be used to select different learning models for a dashcam may further include time of day. The characteristics may further include the installation configuration/position. The characteristics may further include the organization that controls the vehicle or location where the edge device is installed.

The machine learning system 170 uses data to train the machine learning models, and provides the trained machine learning models to machine learning model store 175. In one embodiment, as will be described below, the machine learning system 170 is a split system with a base layer and a sharded layer. The base layer, in one embodiment, is common to the various machine learning models. The sharded model provides a thin personalization layer which allows optimization based on the characteristics of the edge device and/or its environment.

Figure 2:
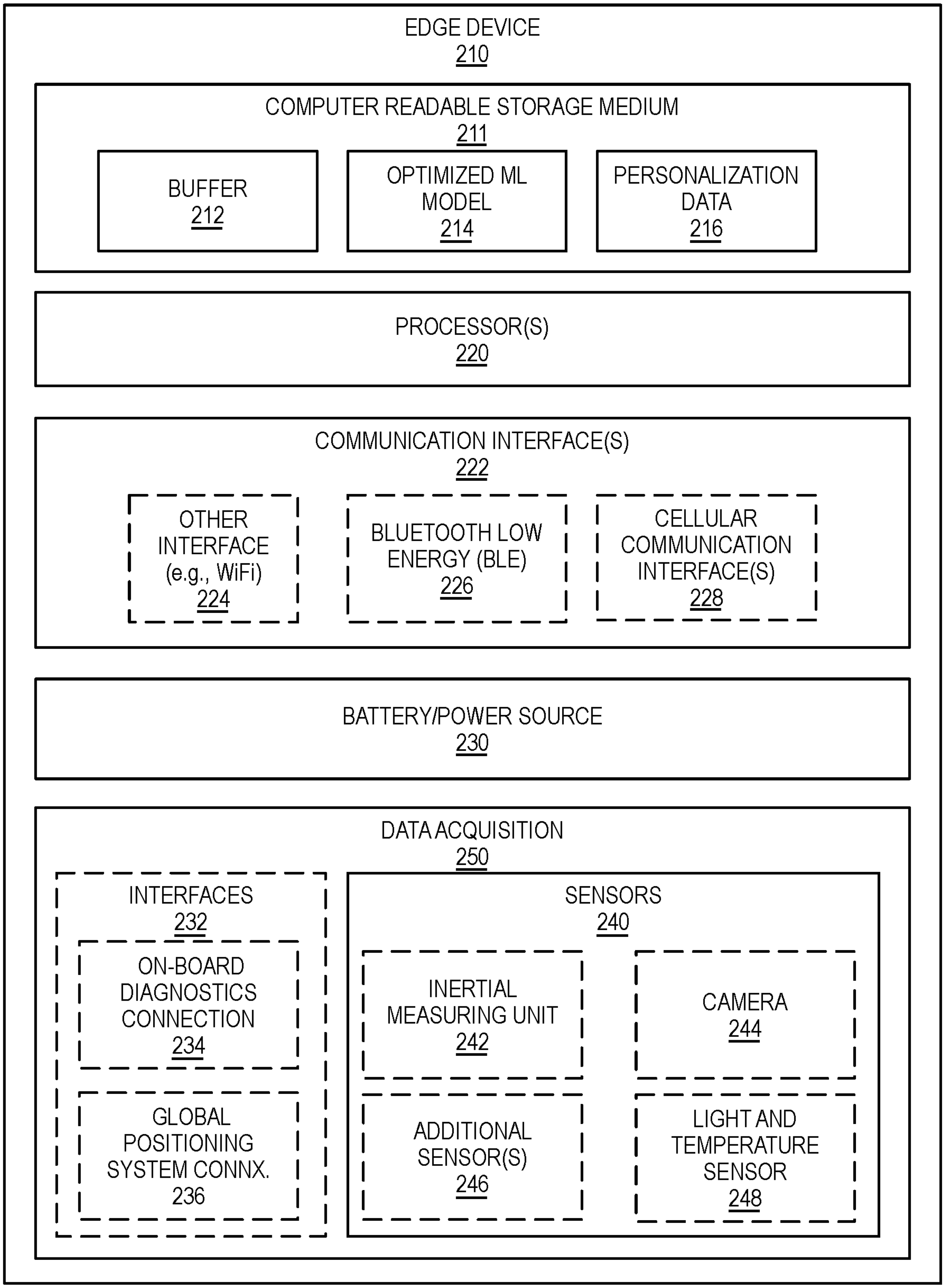
FIG. 2 is a block diagram illustrating an exemplary edge device system, according to some embodiments.

FIG. 2 is a block diagram illustrating an exemplary edge device system, according to some embodiments. Edge devices, in one embodiment, gather data usually in real time to improve processes. Edge devices generally are at the end of a network connection and include processing power and memory, but are limited in both. Edge devices may include sensor systems such as cameras, temperature sensors, etc. The exemplary edge device 210 in one embodiment is a dashboard camera. Other edge devices may include security cameras, and other devices.

The edge device 210 includes a computer readable storage medium 211. The storage medium may be a random access memory (RAM) or other storage device 211 for storing information and instructions to be executed by processor 220. Storage medium 211 may also be used for storing temporary variables or other intermediate information during execution of instructions by processor 220. Storage medium 211 may be a Flash memory or other storage which is capable of storing data when no power is supplied to the system.

Storage medium 211 in one embodiment includes the optimized deep learning model 214, and personalization data 216. The optimized deep learning model 214, in one embodiment, comprises a deep learning model customized for the environment of the device. In one embodiment, the optimized deep learning model 214 comprises a machine learning model optimized with settings based on data from the edge device, as will be described below. In one embodiment, the optimized model 214 comprises a machine learning model including a base layer and a shard layer. The shard layer may be selected based on the class of the device, as will be described below.

The personalization data 216 in one embodiment comprises data specific to the particular edge device 210. In one embodiment, personalization data 216 may include data about prior false positive identifications, which may be used in optimizing the optimized machine learning model 214.

The storage medium 211 further includes buffer 212, which is a temporary storage for data. The buffer 212 may be used to temporarily store data before transmission. In addition, the storage medium 211 may include additional memory storage, for storing data captured by the edge device 210. The storage medium 211 has limited storage, in one embodiment, because the edge device is a free-standing device with limited memory capabilities.

Processor 220 runs the machine learning models on the edge device. The processor 220 may be a processing device such as a central processing unit (CPU), a digital signal processor (DSP), graphics processor (GPU), or another type of processor 220. The processor 220 has limited processing capabilities, in one embodiment. In one embodiment, by providing an optimized machine learning model 214, the machine learning model is more compact than a general model, enabling the limited processing of the edge device 210 to run the machine learning model and provide real-time alerts and feedback, as well as other services.

The edge device 210 in one embodiment can communicate with a cloud agent (not shown) via one or more communication interfaces 222. The communication interfaces 222 may include one or more of Bluetooth Low Energy (BLE) 226, cellular communication interfaces 228, or other interfaces 224 which may include Wi-Fi. In one embodiment, when the edge device 210 is a dashboard camera in a vehicle, the communication interface 222 may be a cellular communication interfaces 228. The device 210 may include one or more interfaces. In one embodiment, the edge device 210 utilizes the communication interface 222 best for its current use. For example, to transmit large volumes of data, such as video data, the system may preferentially use cellular interface 228.

The edge device 210 includes a battery and/or other power sources 230. The limitations on power impact the processing, and thus is a further incentive for using the optimized machine learning model, which is more compact and thus faster and computationally cheaper.

The edge device 210 includes data acquisition 250. The data acquisition 250 may include sensors 240 and/or interfaces for data acquisition 232. The sensors may include one or more of a camera 244, an inertial measuring unit 242, light and temperature sensors 248, and/or additional sensors 246. In addition to on-board sensors 240, the edge device 210 may include one or more interfaces 232 for acquiring data from external data sources. For example, if the edge device 210 is a dashcam, the interfaces 232 may include a connection to the on-board diagnostics (OBD) 234 which obtains data directly from the vehicle. The interfaces 232 may also include a connection to a global positioning system (GPS) 236 provided by the vehicle. Alternatively, or additionally, the edge device 210 itself may include a GPS in its sensors 240. The specific sensors 240 and interfaces 232 depend on the type of edge device 210. The list of sensors and interfaces provided herein should not be considered an exhaustive list. Additional types of data may also be acquired by data acquisition 250.

The data from data acquisition 250 may be stored in buffer 212, and used by processor 220, to analyze using the optimized machine learning model 214. The data may also be sent to external systems via communication interfaces 222.

Figure 3:
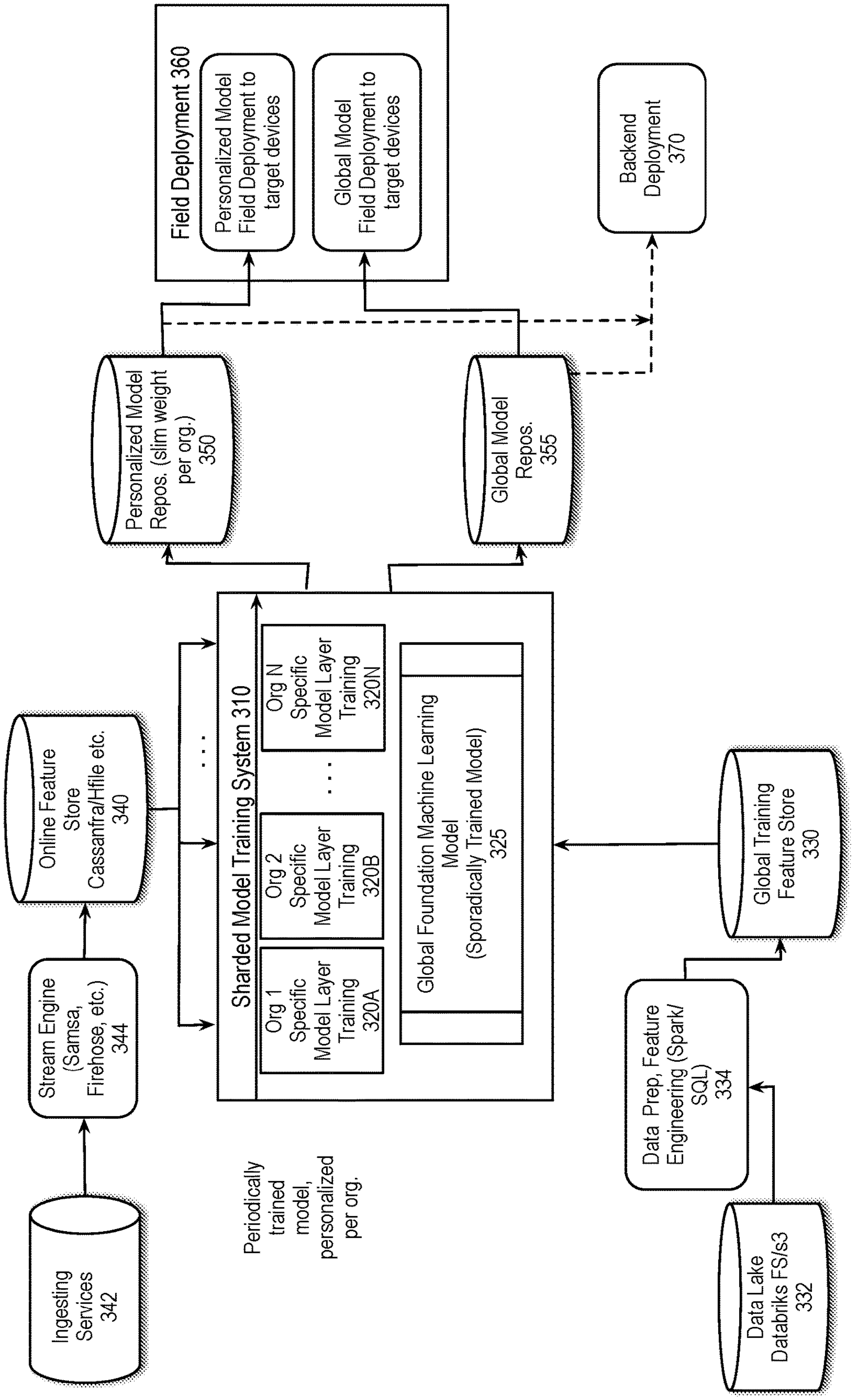
FIG. 3 is a block diagram illustrating an exemplary machine learning system, according to some embodiments.

FIG. 3 is a block diagram illustrating an exemplary machine learning system, according to some embodiments. The machine learning system generates and trains the optimized machine learning model discussed above in one embodiment.

In one embodiment, the sharded model training system 310 trains both class specific model layers 320A-320N, and the global foundation machine learning model 325, or base layer 325. In one embodiment, the class specific model layers 320A-320N may be specific to an organization which utilizes a plurality of edge devices of the same type. In one embodiment, the class specific model layers 320A-320N may be separated based on classification of the edge device. The classification may be along multiple axes. For example, for a dashcam, the classes may include vehicle type, dashcam position, and time of day. Thus, the sharded model training system 310 may have separately trained and customized models for each combination of the classes. For example, there may be a trained machine learning shard, or personalized shard layer of the optimized machine learning system for a truck, with a dashcam edge device installed in the top center of the windshield, driving at night.

The inputs to the sharded model training system 310 may include data from a global training feature store 330, which is data from a data lake 332, which had been prepared with feature engineering 334.

In addition, in some embodiments, the sharded model training system 320 receives data from an online data store 340, which in one embodiment represents data collected from the various edge devices. In one embodiment, scalable tool for collecting streaming data from the edge devices is used. In one embodiment, the scalable tool uses a portable library with a simple application programming interface (API). It can be used to intercept requests to service, reformat and send data to a distributed messaging system. In one embodiment, the data collection is done with Kafka because of its scalability and fault tolerant characteristics. It serves particularly well to enable partitioning of the data by or organization and/or timestamp for training/fine-tuning the models. The data from the stream is stored for aggregating and querying streaming data in near real time, using stream engine 344.

In one embodiment, the system aggregates data by a variety of dimensions from thousands of servers coupled to edge devices. In one embodiment, the system queries across a moving time window with on-demand analysis, training, and visualization. In one embodiment, the moving time window is used to define the data for systems that are differentiated by time of day. For this, in one embodiment, Druid, or another near-real-time online analytical processing (OLAP) engine is used. In an Apache™ hadoop environment, the system may use hfiles for feature storage. In one embodiment, the stream engine 344 ingests aggregated time-series data, runs the training or fine-tuning algos and generates reports. In one embodiment, this includes loading pan-organization foundational models, e.g., the base model, and fine-tuning them with data loaded from the real time feature providers. In one embodiment, ingesting services 342 can call into sister services to get any upstream model data and organization specific metadata as needed. Sister services in this context means the services of the machine learning system which deal with data collection, model training, labelling, etc.

The sharded model training system trains the base model 325 and the sharded models 320A-320N. The base model 325 is trained using the global training feature store 330. The sharded models 320A-320N are trained using the online feature store 340. The output of the sharded model training system 310 are trained machine learning models. The trained machine learning models may include personalized models in a personalized model repository 350, and global model repository 355. The personalized model and global model are both deployed via field deployment 360 in one embodiment. In one embodiment, the system also includes backend deployment 370. The combination of the personalized model and global model of the machine learning system is referred to as the optimized machine learning system, which is used by the edge devices to provide monitoring using a machine learning system, as described above.

Figure 4:
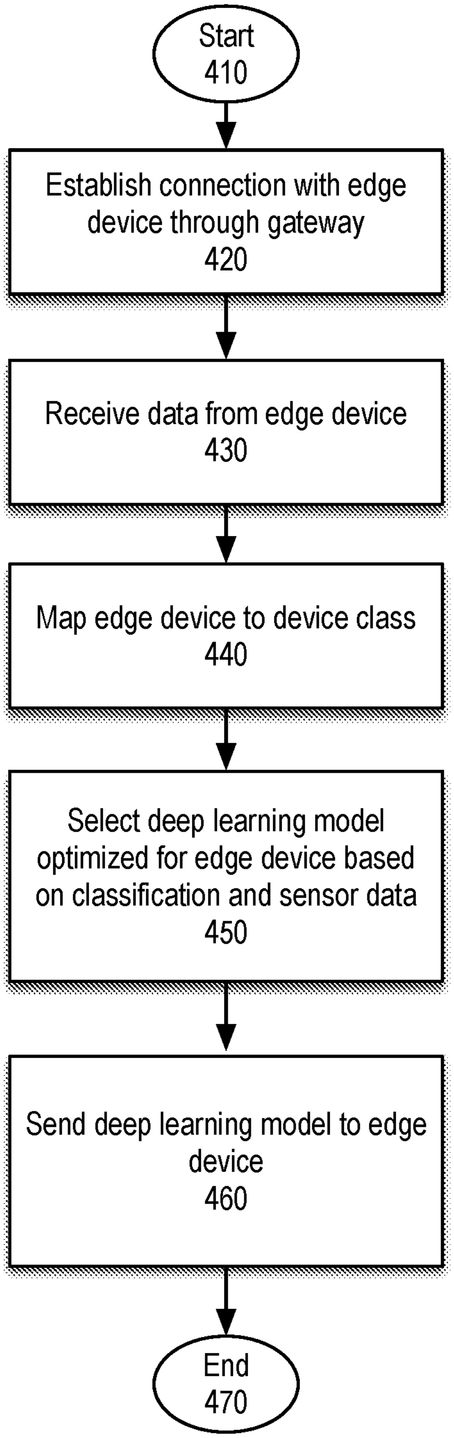
FIG. 4 is an overview flowchart of customizing an edge device system, in accordance with some embodiments.

FIG. 4 is an overview flowchart of customizing an edge device system, in accordance with some embodiments. The process starts at block 410.

At block 420, a connection is established between the edge device and the cloud agent. In one embodiment, this connection is an intermittent connection. In another embodiment, this connection is a continuous connection.

At block 430, the cloud agent receives data from the edge device. The data received may include metadata. The metadata may include GPS data, orientation information from an inertial sensor, OBD port data, time of day, light level, weather data, temperature data, driver position, etc. This is referred to as metadata because it is data about the conditions in which the edge device is being used. The data received may include sensor data, collected by the edge device. In one embodiment, the sensor data is camera data.

At block 440, the data received is used by the cloud agent to map the edge device to a device class. The device class may be the organization to which the device belongs, or the current environment of the device. As noted above, this class may be for example a combination of vehicle class/vehicle type, edge device position, and time of day.

At block 450, the deep learning model optimized for the edge device class and sensor data is selected. In one embodiment, the optimized machine learning model includes a base layer, common to all devices, and the personalized shard layer, fitted to the class. In one embodiment, the cloud agent uses a combination of deep learning and heuristic algorithms to map each of the edge devices to the specific class. In one embodiment, the cloud agent also uses the meta data to determine the orientation of the edge device. Using a combination of the class and orientation, and optionally other features, the cloud agent selects the deep learning model optimized for that combination of features.

At block 460, the deep learning model is sent to the edge device for use. The deep learning model is optimized for the particular edge device, and classification. This enables the deep learning model to be more compact, and thus requiring less processing power and memory, then a general deep learning model. The process then ends at block 470.

Figure 5:
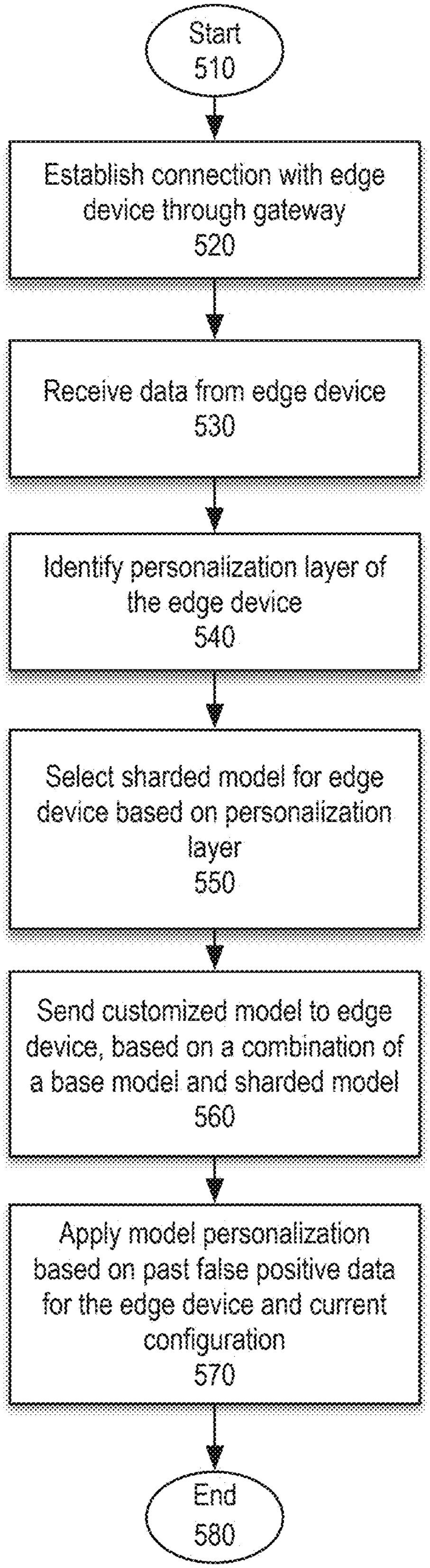
FIG. 5 is a flowchart of using sharded models for customizing an edge device, in accordance with some embodiments.

FIG. 5 is a flowchart of using sharded models for customizing an edge device, in accordance with some embodiments. The process starts at block 510.

At block 520, a connection is established between the edge device and the cloud agent. In one embodiment, the connection is a cellular connection.

At block 530, data is received from the edge device. As noted above, the data may be metadata.

At block 540 the personalization layer of the edge device is identified. The personalization layer in one embodiment, personalizes the model for a customer. A customer, in one embodiment, is an organization which deploys a plurality of edge devices in similar environments. The edge device data has little covariate shift, when partitioned by organization, thus by personalizing the system to the organization it can be optimized. For example, for dashcams, vehicles are fairly homogeneous per organization and internals of the vehicle do not change over time. The most dynamic part of the domain are the drivers who are rotated in and out of a vehicle. In contrast, between organizations there is large variance, for example very different vehicle sizes and types, with different camera mounts. Thus, by personalizing by organization/customer group, the system can optimize the machine learning.

At block 550, the sharded model for the edge device is selected based on the personalization layer. The personalization layer is derived by the cloud agent based on data from the edge device, as noted above.

At block 560, the customized model is sent to the edge device. The customized machine learning model includes the base model and the personalized sharded model.

At block 570, the model is further personalized, by adjusting the machine learning system based on past false positive identifications for the particular edge device. In one embodiment, the personalization is for the edge device and the driver/stakeholder interfacing with the device. In one embodiment, the system provides the ability to identify false positives to the edge device. In one embodiment, this may be done via a user interface on the edge device itself, via a mobile device application, and/or via a web page. In one embodiment, when the machine learning system detects an event, it raises the event to drivers and/or other stakeholders. In one embodiment, the system accepts feedback on whether the detected event was correctly identified or not. The system personalizes models by "remembering" false positives for a specific edge device and stakeholder (in some embodiments driver and vehicle), so that the model can avoid repeating the false positive in the future. Some examples of events that may be raised are a driver not wearing a seatbelt, a driver smoking, and a driver using a mobile phone while driving. Once a false positive notice is received, it is stored in the edge device, and applied to the machine learning system, to further personalize and optimize the machine learning model. By storing the false positive, and the data that lead to the false positive, the system becomes more accurate with further personalization. Furthermore, the system can maintain this layer of personalization even when the machine learning system is updated. In one embodiment, the edge device periodically provides true positive and false positive images to the cloud agent. In one embodiment, the cloud agent or server system stores the personalization data associated with the particular edge device. This enables the personalization to be retained when the edge device is refreshed.

At block 580, the process ends, with the optimized machine learning system in the edge device.

Figure 6:
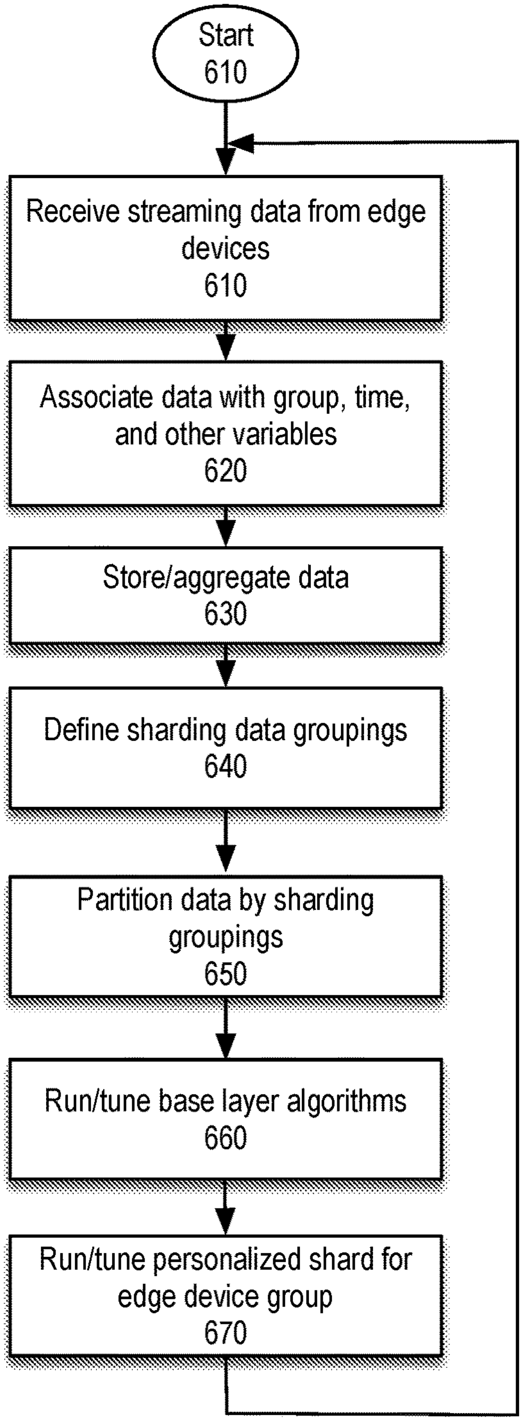
FIG. 6 is a flowchart of generating sharded machine learning models, in accordance with some embodiments.

FIG. 6 is a flowchart of generating sharded machine learning models, in accordance with some embodiments. The process starts at block 610.

At block 610, streaming data is received from the edge device. Streaming data is the data being captured by the edge device, such as a camera.

At block 620, the data is associated with a group, time, and other variables. In one embodiment, this association is happening in nearly real time, and provides the full data set for querying, including the context provided by the group, time, and other variables.

At block 630, the data is stored.

At block 640, the sharding data groupings are defined. As noted above the system may shard the data based on a variety of factors. The facts are specific to the type of edge device, and potentially relevant configurations. For example, for a dashcam the classifications may be based on the type or class of vehicle, the mounting location/orientation, and the time of day. Similarly, for a security camera, the classifications may be based on the type of environment (e.g., outdoor, indoor in home, indoor in an office, etc.), mounting location (e.g., height and orientation) and time of day. In one embodiment, the sharding may be based on the organization to which the edge device belongs. In one embodiment, the sharding grouping definition is set at one time, when the edge device use cases are defined. In one embodiment, for large groups the sharding grouping definition is dynamic, with ""clusters" identified dynamically based on the collected data. In one embodiment, standard machine learning algorithms are used to auto cluster the data. In one embodiment, a K-means algorithm is used for clustering.

At block 650, the data is partitioned based on the sharding groupings. Once the data is partitioned, it can be used to train and tune the sharded machine learning models.

At block 660, the base layer algorithms are tuned. In one embodiment, the system utilizes all of the data from the edge devices unsharded for the base layer algorithm tuning.

In contrast, at block 670, the personalized sharded machine learning elements are tuned. The process then returns to block 610. This process of tuning the base layers algorithms and sharded models occurs periodically. In one embodiment, the system continuously collects and processes the data, and periodically tunes the machine learning models. In another embodiment, the data is collected, but processing occurs only when the machine learning model re-training is initiated. The system in one embodiment updates the underlying models after the generation of models, internal validation/testing of the models, when the cost-benefit analysis indicates that an update would be worthwhile.

Figure 7:
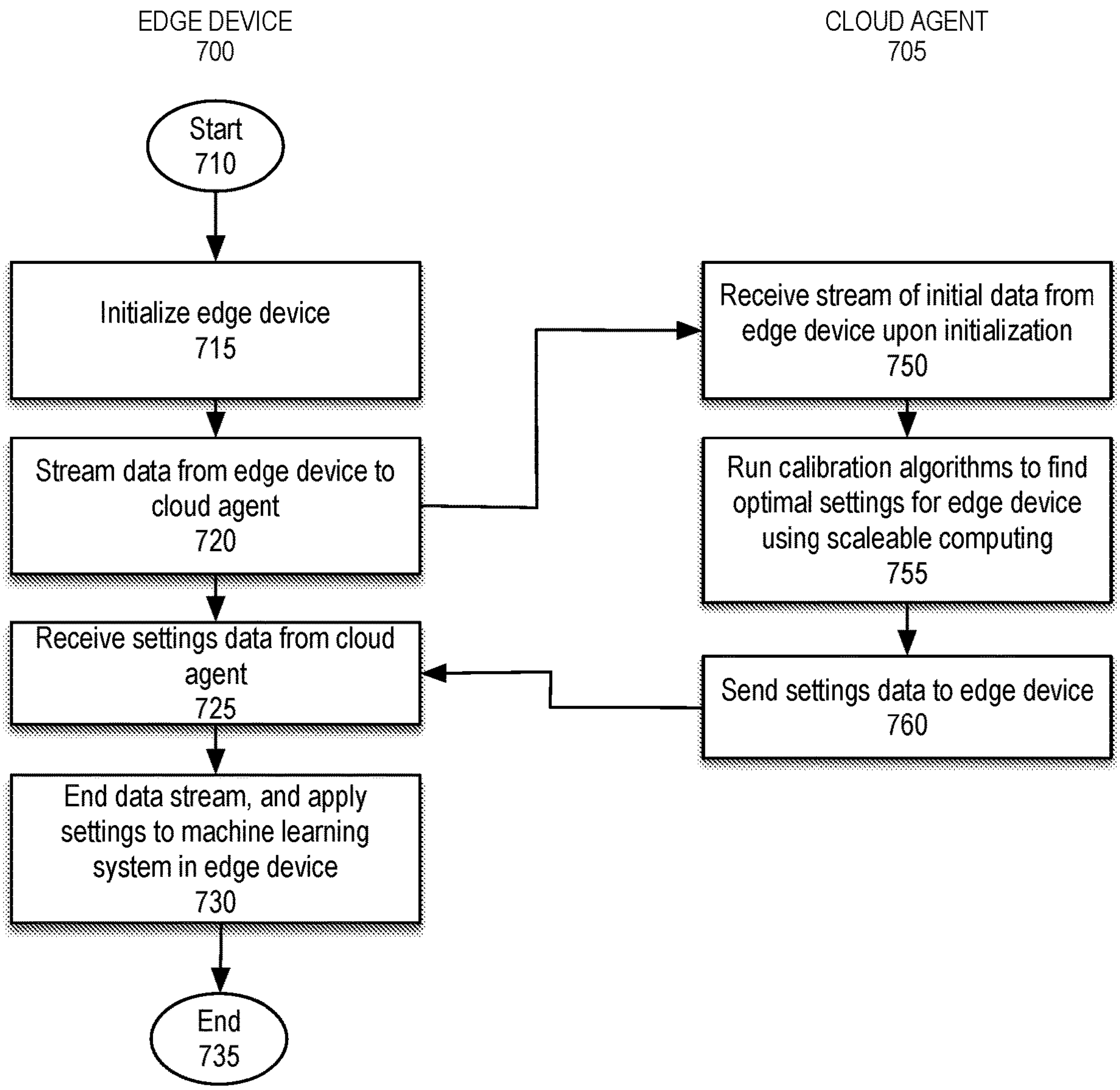
FIG. 7 is a flowchart of calibration on a cloud agent for an edge device, in accordance with some embodiments.

FIG. 7 is a flowchart of calibration on a cloud agent for an edge device, in accordance with some embodiments. The process starts at block 710. The process illustrated takes place on the edge device 700 and cloud agent 705. The portion of the figure on one side is the edge device, while the other side illustrates the process executed by the cloud agent 705.

At block 715, the edge device is initialized. In one embodiment, this occurs each time the edge device is turned on.

At block 720, data from the edge device is streamed to the cloud agent upon initialization. The data in one embodiment includes video data.

The cloud agent receives the stream, at block 750. The cloud agent then runs a calibration algorithm to find the optimal settings for the edge device, using scalable computing, at block 755. Because the cloud agent is network connected processor, it does not have the same processor and memory constraints as the edge device. Thus, the cloud agent can provide the calibration algorithm. Furthermore, in one embodiment, the cloud agent uses data across multiple edge devices, to improve calibration. The ability to use such crowd sourced information improves the quality and speed of the calibration. For example, a second edge device in the same environment and setup may be calibrated nearly instantaneously, because the cloud agent has the calibration data for all of the edge devices, and their respective environments and setups.

At block 760, the settings data are sent to the edge device.

The settings data are received from the cloud agent by the edge device, at block 725. In one embodiment, the settings include settings for optimizing the machine learning system, and optionally settings for sensors and other aspects of the edge device.

At block 730, the data stream is ended, and the settings are applied to the machine learning system in the edge device. The machine learning system is then initiated, and the edge device starts analyzing the data locally. In one embodiment, the streaming has a short duration, between seconds and minutes. The process then ends at block 735.

In some exemplary cases of the process described with respect to FIG. 7, the data sent is streaming video and optionally metadata such as GPS data for location, accelerometer data for position, and temperature data. In one embodiment, the calibration includes detecting variations in the one or more sensors, and the settings sent to the device include calibration data for the sensors. In one embodiment, the calibration includes determining conditions that may impact the functioning of one or more sensors. For example, the conditions may include weather and light conditions that may impact a camera, and the settings may include settings or calibration for the camera based on the conditions. In one embodiment, the calibration may further include determining the orientation and distance of the device to an object under observation, and the settings include setting a focal point. In some embodiments, the term "calibration" and "settings" may be substituted. For example, calibrating a camera may include making changes to the function of the camera itself, to the software interpreting the camera data, or both.

Figure 8:
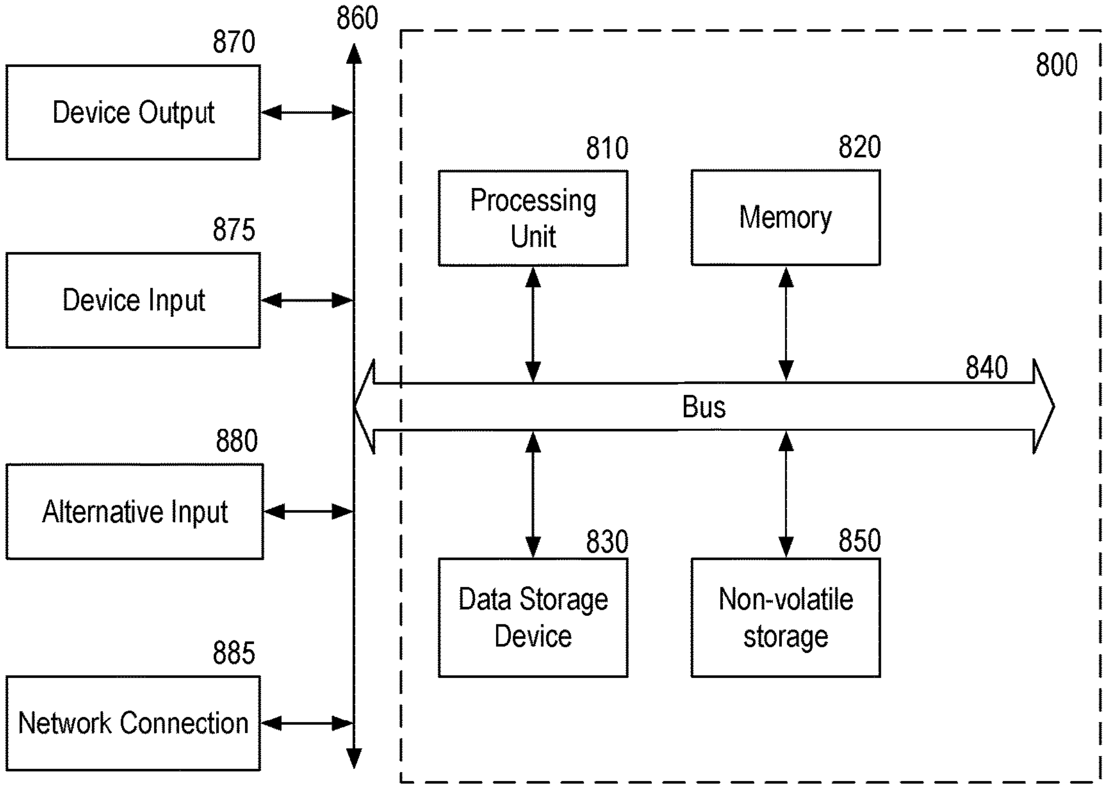
FIG. 8 is a block diagram of a computer system which may be used in some embodiments.

FIG. 8 is a block diagram of a computer system which may be used in some embodiments. It will be apparent to those of ordinary skill in the art, however that other alternative systems of various system architectures may also be used. The cloud agent, machine learning system, and edge devices may include computer systems in accordance with some of the below described embodiments.

The computer system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), graphics processor (GPU), or another type of processing unit 810.

The system further includes, in one embodiment, a memory 820, which may be a random access memory (RAM) or other storage device 820, coupled to bus 840 for storing information and instructions to be executed by processor 810. Memory 820 may also be used for storing temporary variables or other intermediate information during execution of instructions by processing unit 810.

The system also comprises in one embodiment a read only memory (ROM) 850 and/or static storage device 850 coupled to bus 840 for storing static information and instructions for processor 810.

In one embodiment, the system also includes a data storage device 830 such as a magnetic disk or optical disk and its corresponding disk drive, or Flash memory or other storage which is capable of storing data when no power is supplied to the system. Data storage device 830 in one embodiment is coupled to bus 840 for storing information and instructions.

In some embodiments, the system may further be coupled to an output device 870, such as a computer screen, speaker, or other output mechanism coupled to bus 840 through bus 860 for outputting information. The output device 870 may be a visual output device, an audio output device, and/or tactile output device (e.g., vibrations, etc.)

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network, or other method of accessing other devices. The communication device 885 may further be a null-modem connection, or any other mechanism that provides connectivity between the computer system 800 and the outside world.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a portable device containing a subset of the computer hardware components described above. For example, the handheld device may be configured to contain only the bus 840, the processor 810, and memory 850 and/or 820. The portable device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as an edge device. For example, the appliance may include a processing unit 810, a data storage device 830, a bus 840, and memory 820, and no input/output mechanisms, or only rudimentary communications mechanisms, such as a small touchscreen that permits the user to communicate in a basic manner with the device. In general, the more special purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on a machine-readable medium locally or remotely accessible to processor 810. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

Furthermore, the present system may be implemented on a distributed computing system, in one embodiment. In a distributed computing system, the processing may take place on one or more remote computer systems, and processing may be shared among a plurality of processors, across a network. The system may provide local processing using a computer system 800, and further utilize one or more remote systems for storage and/or processing. In one embodiment, the present system may further utilize distributed computers. In one embodiment, the computer system 800 may represent a client and/or server computer on which software is executed. Other configurations of the processing system executing the processes described herein may be utilized without departing from the scope of the disclosure.

In the above description, numerous specific details such as edge device/sharding/personalization embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams. Furthermore, the order of operations is not constrained to the order illustrated unless the processes are dependent on each other. Additionally, one or more of the processes described may be interrupt driven, and thus the system does not check for an occurrence, but rather the occurrence sends a notification to trigger actions.

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method of setting up and customizing a dashcam comprising:

establishing a bidirectional channel with the dashcam when the dashcam is initially turned on;

receiving streaming data from the dashcam via the bidirectional channel;

analyzing the streaming data to run a calibration algorithm to identify settings for a machine learning model for the dashcam;

sending the settings to the dashcam;

upon receipt of the settings, the dashcam customizing the machine learning model with the settings, turning off the bidirectional channel for streaming data, and running the machine learning model on the dashcam, the machine learning model utilizing the settings from the analyzing.

2. The method of claim 1, wherein the streaming data comprises video and metadata.

3. The method of claim 2, wherein the metadata includes one or more of: global positioning system (GPS) location, accelerometer data, temperature.

4. The method of claim 1, wherein the analyzing includes detecting variations in one or more sensors, and the settings include calibration data for the sensors.

5. The method of claim 1, wherein the analyzing includes determining conditions including weather conditions and light conditions, and the settings include calibrating a camera based on the conditions.

6. The method of claim 1, wherein the analyzing includes determining orientation and distance of the dashcam to an object under observation, and the settings include setting a focal point.

7. The method of claim 1, wherein running the calibration algorithm further includes utilizing data from previously configured dashcam, in calculating the settings.

8. A method of setting up and customizing a dashcam comprising:

streaming data from the dashcam to a remote server system upon first initialization, the streaming data sent for analysis at the remote server system, for a calibration algorithm to identify settings for a machine learning model for the dashcam;

receiving the settings from the remote server system;

set up the machine learning model using the settings from the remote server system; and turning off the streaming data when the machine learning model is set up.

9. The method of claim 8, wherein the streaming data comprises video and metadata.

10. The method of claim 9, wherein the metadata includes one or more of: global positioning system (GPS) location, accelerometer data, temperature.

11. The method of claim 8, wherein the analysis includes detecting variations in one or more sensors, and the settings include calibration data for the sensors.

12. The method of claim 8, wherein the analysis includes determining conditions including weather conditions and light conditions, and the settings include calibrating a camera based on the conditions.

13. The method of claim 8, wherein the analysis includes determining orientation and distance of the dashcam to an object under observation, and the settings include setting a focal point.

14. The method of claim 8, wherein running the calibration algorithm further includes utilizing data from previously configured dashcam, in calculating the settings.

15. A dashboard camera comprising:

a sensor to obtain streaming data;

a communications interface to stream data from the dashboard camera to a remote server system upon initial set-up of the dashboard camera, the streaming data sent for analysis at the remote server system, to identify settings for a machine learning model for the dashboard camera;

a storage medium to store the settings received from the remote server system;

a processor to set up the machine learning model using the settings from the remote server system; and the communications interface further to turn off the streaming data when the machine learning model is set up.

16. The dashboard camera of claim 15, wherein the streaming data comprises video and metadata.

17. The dashboard camera of claim 15, wherein the analysis includes detecting variations in one or more sensors, and the settings include calibration data for the sensors.

18. The dashboard camera of claim 15, wherein the analysis includes determining conditions including weather conditions and light conditions, and the settings include calibrating the dashboard camera based on the conditions.

19. The dashboard camera of claim 15, wherein the analysis includes determining orientation and distance of the dashboard camera to an object under observation, and the settings include setting a focal point.

20. The dashboard camera of claim 15, wherein the analysis at the remote server system utilizes data from previously configured dashboard cameras in calculating the settings.

* * * * *